US010663638B2

(12) United States Patent
Lee et al.

(10) Patent No.: US 10,663,638 B2
(45) Date of Patent: May 26, 2020

(54) 2D/3D SWITCHABLE BACKLIGHT UNIT AND IMAGE DISPLAY APPARATUS USING THE SAME

(71) Applicant: SAMSUNG ELECTRONICS CO., LTD., Suwon-si (KR)

(72) Inventors: Hongseok Lee, Seongnam-si (KR); Geeyoung Sung, Daegu (KR); Joonyong Park, Suwon-si (KR); Hoon Song, Yongin-si (KR); Bongsu Shin, Seoul (KR); Yoonsun Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/000,183

(22) Filed: Jan. 19, 2016

(65) Prior Publication Data

US 2016/0216433 A1   Jul. 28, 2016

(30) Foreign Application Priority Data

Jan. 27, 2015   (KR) .................. 10-2015-0012847

(51) Int. Cl.
*F21V 8/00* (2006.01)
*H04N 13/32* (2018.01)
*H04N 13/356* (2018.01)

(52) U.S. Cl.
CPC ......... *G02B 6/0036* (2013.01); *G02B 6/0068* (2013.01); *G02B 6/0076* (2013.01); *H04N 13/32* (2018.05); *H04N 13/356* (2018.05)

(58) Field of Classification Search
CPC .. G02B 6/0028; G02B 6/0031; G02B 6/0038; G02B 6/0036; G02B 6/0068;
(Continued)

(56) References Cited

U.S. PATENT DOCUMENTS 5,396,350 A * 3/1995 Beeson .................... F21V 5/02
                                                       349/62
7,001,060 B1 * 2/2006 Kimura ................ G02B 6/0053
                                                       349/63
(Continued)

FOREIGN PATENT DOCUMENTS

KR   10-2007-0002647 A     1/2007
KR   10-2007-0097303 A    10/2007
(Continued)

OTHER PUBLICATIONS

Masaru Minami et al., "34.5L: Late-News Paper: Glasses-Free 2D/3D Switchable Display Using a Unique Light Guide", SID 11 Digest, 2011, pp. 468-471 (4 pages total).

*Primary Examiner* — Anh T Mai
*Assistant Examiner* — Fatima N Farokhrooz
(74) *Attorney, Agent, or Firm* — Sughrue Mion, PLLC

(57) ABSTRACT

A two-dimensional (2D)/three-dimensional (3D) switchable backlight unit and an image display apparatus using the 2D/3D switchable backlight unit are provided. The 2D/3D switchable backlight unit includes: a light source unit; a first light guide plate, within which light from the light source unit is totally internally reflected; and a plurality of refraction patterns, each having a trapezoidal form. The light source unit may include a first light source and a second light source.

14 Claims, 12 Drawing Sheets

(58) Field of Classification Search
CPC ............ G02B 6/0076; G02F 1/133615; H04N 13/32; H04N 13/356
See application file for complete search history.

(56) References Cited

U.S. PATENT DOCUMENTS

| | | | |
|---|---|---|---|
| 8,432,512 B2 | 4/2013 | Kim et al. | |
| 2004/0042194 A1* | 3/2004 | Hsieh | G02B 6/0021 362/625 |
| 2005/0169012 A1* | 8/2005 | Takeuchi | G02B 6/0041 362/602 |
| 2005/0270798 A1* | 12/2005 | Lee | G02B 6/0038 362/607 |
| 2007/0091617 A1* | 4/2007 | Couzin | G02B 5/021 362/341 |
| 2007/0109811 A1 | 5/2007 | Krijn et al. | |
| 2007/0223247 A1* | 9/2007 | Lee | G02B 5/045 362/606 |
| 2007/0230213 A1* | 10/2007 | Lee | G02B 6/0038 362/606 |
| 2008/0145960 A1* | 6/2008 | Kolodin | H01L 25/0753 438/28 |
| 2009/0034295 A1* | 2/2009 | Song | G02B 6/0036 362/620 |
| 2009/0091949 A1* | 4/2009 | Lee | G02B 6/0036 362/620 |
| 2009/0316058 A1* | 12/2009 | Huizinga | G02B 6/0053 349/15 |
| 2010/0157200 A1* | 6/2010 | Mun | G02B 6/0056 349/65 |
| 2012/0105765 A1* | 5/2012 | Kawai | G02F 1/133605 349/62 |
| 2012/0206935 A1* | 8/2012 | Seo | G02B 6/0023 362/602 |
| 2014/0035802 A1* | 2/2014 | Momose | G09G 3/36 345/102 |
| 2018/0156963 A1* | 6/2018 | Fattal | G09G 3/003 |

FOREIGN PATENT DOCUMENTS

| | | |
|---|---|---|
| KR | 10-2008-0001491 A | 1/2008 |
| KR | 10-2012-0045868 A | 5/2012 |
| KR | 10-2013-0043966 A | 5/2013 |

* cited by examiner

2D/3D SWITCHABLE BACKLIGHT UNIT AND IMAGE DISPLAY APPARATUS USING THE SAME

RELATED APPLICATION

This application claims priority from Korean Patent Application No. 10-2015-0012847, filed on Jan. 27, 2015, in the Korean Intellectual Property Office, the disclosure of which is incorporated herein in its entirety by reference.

BACKGROUND

1. Field

Apparatuses and methods consistent with exemplary embodiments relate to two-dimensional (2D)/three-dimensional (3D) switchable backlight units and image display apparatuses using the 2D/3D switchable backlight units.

2. Description of the Related Art

In recent years, as the flat panel display market has become saturated, 3D image display apparatuses have attracted the attention of the flat panel display industry as a mainstream application the next generation flat panel display industry. Currently, most flat panel display-based television (TV) products and movie theaters provide 3D images that can only be viewed using special eyeglasses. However, the use of eyeglasses to watch 3D images on typical TVs and mobile devices is not ideal for most consumers, and thus, 3D image display methods that do not use eyeglasses are being researched and developed in consideration of user convenience.

Also, it is necessary for a 3D image display apparatus that does not require eyeglasses to be able to switch between displaying a 2D image and displaying a 3D image for compatibility purposes. An apparatus for conversion between a 2D image and a 3D image may be disposed in an image display apparatus.

SUMMARY

One or more exemplary embodiments may provide a 2D/3D switchable backlight unit that satisfies the optical characteristics required for both a 2D mode and a 3D mode, and an image display apparatus including such a 2D/3D switchable backlight unit.

One or more exemplary embodiments may provide a backlight unit capable of being switchable displaying 2D images and displaying 3D images, and such a backlight unit may include only a backlight unit structure without the need for any additional apparatus, and an image display apparatus including such a backlight unit.

One or more exemplary embodiments may provide a high efficiency 3D backlight unit which uses a light-emitting method taking advantage of total internal reflection, and an image display apparatus including such a 3D backlight unit.

Additional exemplary aspects will be set forth in part in the description which follows and, in part, will be apparent from the description, or may be learned by practice of exemplary embodiments.

According to an aspect of an exemplary embodiment, a 2D/3D switchable backlight unit includes a light source unit; a first light guide plate within which light from the light source unit is totally internally reflected; and a plurality of refraction patterns each having a trapezoidal form, wherein the light source unit includes a first light source unit and a second light source unit.

The 2D/3D switchable backlight unit may further include a supporting film disposed on the plurality of refraction patterns each having the trapezoidal form.

According to an aspect of another exemplary embodiment, a 2D/3D switchable backlight unit includes a light source unit; and a light guide plate within which light from the light source unit is totally internally reflected, wherein the light source unit includes a first light source unit and a third light source unit, and the light guide plate includes a first light guide plate, a second light guide plate, and a plurality of refraction patterns each having a trapezoidal form and disposed between the first light guide plate and the second light guide plate.

The 2D/3D switchable backlight unit may further include a scattering layer disposed on a lower surface of the second light guide plate.

The 2D/3D switchable backlight unit may further include a third light guide plate disposed under the first light guide plate, the third light guide plate being separate from the first light guide plate.

The plurality of refraction patterns each having the trapezoidal form may be arranged in one direction.

The plurality of refraction patterns each having the trapezoidal form may be arranged in a horizontal direction.

The second light guide plate may include at least one of a directional scattering structure and a directional film.

The plurality of refraction patterns may be arranged in a plurality of pattern lines.

The plurality of pattern lines may be slanted.

The 2D/3D switchable backlight unit may further include an image panel disposed in a light radiation direction of the 2D/3D switchable backlight unit.

The plurality of refraction patterns each having the trapezoidal form may have an arrangement period, a height, and an angle of slant.

The arrangement period, the height, and the angle of slant may be adjustable.

According to an aspect of another exemplary embodiment, a method of manufacturing a 2D/3D switchable backlight unit includes coating a first synthetic resin on a first light guide plate; pressing a mold, comprising a plurality of concave pyramid recesses, in into the first synthetic resin, curing the first synthetic resin; coating a second synthetic resin on a second light guide plate; pressing the cured first synthetic resin into the second synthetic resin; and curing the second synthetic resin after.

The curing of the first synthetic resin or the curing of the second synthetic resin may be performed by at least one of heat curing and ultraviolet (UV) curing.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1A:
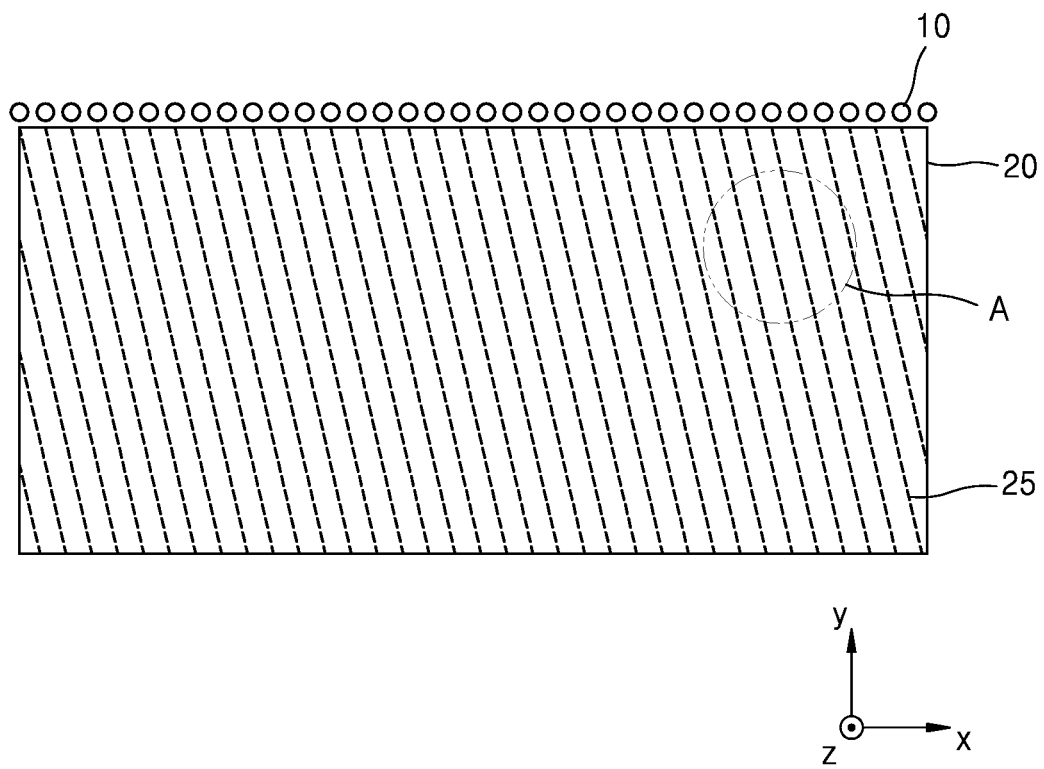
FIG. 1A is a plan view of a 2D/3D switchable backlight unit according to an exemplary embodiment.

Exemplary embodiments will now be described more fully with reference to the accompanying drawings. The described embodiments are merely exemplary, and apparatuses, systems, and methods described herein may, however, be embodied in many different forms and should not be construed as being limited to the specific exemplary embodiments set forth herein. In the description, certain detailed explanations of the related art are omitted when it is deemed that they may unnecessarily obscure the essence of the inventive concept. Like reference numerals in the drawings denote like elements.

An expression "A is connected to B" as used herein refers that A is "optically connected" to B via another device between A and B as well as that "A is directly connected to B". Throughout the specification, when a portion "includes" an element, another element may be further included, rather than excluding the existence of the other element, unless otherwise described.

FIG. 1A is a plan view of a 2D/3D switchable backlight unit according to an exemplary embodiment. Referring to FIG. 1A, the 2D/3D switchable backlight unit may include a plurality of light sources 10, a light guide plate 20, and a plurality of pattern lines 25.

The plurality of light sources 10 may be disposed along one or more sides of the light guide plate 20. The light sources may be disposed along one side of the light guide plate 20 parallel to the x-axis, as shown in FIG. 1A, or the light sources may be disposed along a first side parallel to the x-axis and a second side, opposite the first side.

The plurality of pattern lines 25 may extend over the light guide plate 20 in a slanted direction, thereby forming a linear light source in a slanted direction. The plurality of pattern lines 25 may be formed within the light guide plate 20. Each of the plurality of pattern lines 25 may be arranged lengthwise in the slanted direction, and the plurality of pattern lines 25 may be arranged such that the plurality of pattern lines 25 contact one another in the horizontal direction or they may be spaced apart from one another at regular intervals in the horizontal direction. The vertical direction refers to the y-axis direction in FIG. 1A, and the horizontal direction refers to the x-axis direction in FIG. 1A.

Due to the arrangement of the plurality of pattern lines 25 in the slanted form, they may include information with respect to both the horizontal direction and the vertical direction when implementing a 3-D image. Thus, each of the plurality of pattern lines 25 may include more information in a narrow width as compared to a pattern line arranged in the vertical or horizontal direction alone.

Figure 1B:
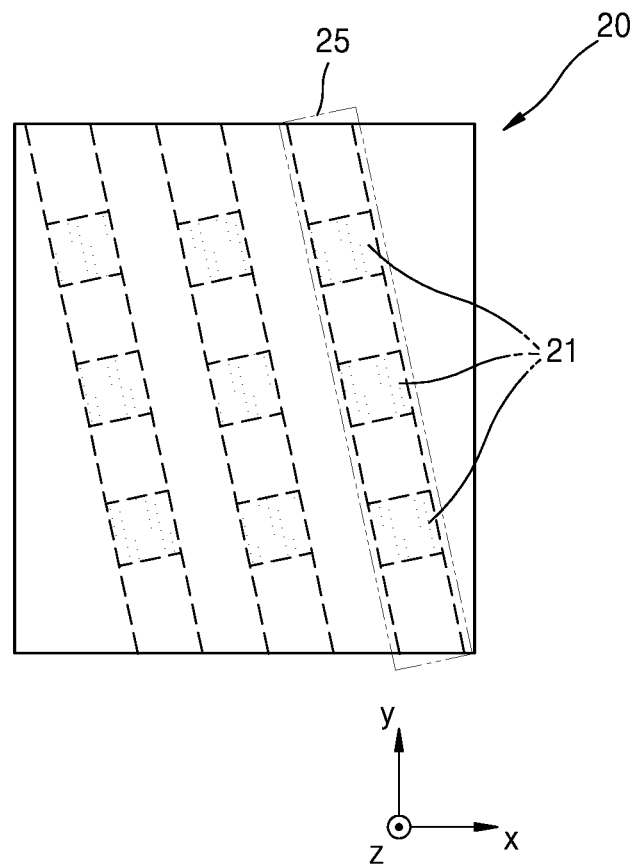
FIG. 1B is a plan view of an area obtained by magnifying a portion A in FIG. 1A.

FIG. 1B is a plan view of an area obtained by magnifying a portion A in FIG. 1A. Referring to FIG. 1B, each of the pattern lines 25 may include a plurality of refraction patterns 21. The plurality of refraction patterns 21 may be arranged at regular intervals along each of the pattern lines 25.

Figure 1C:
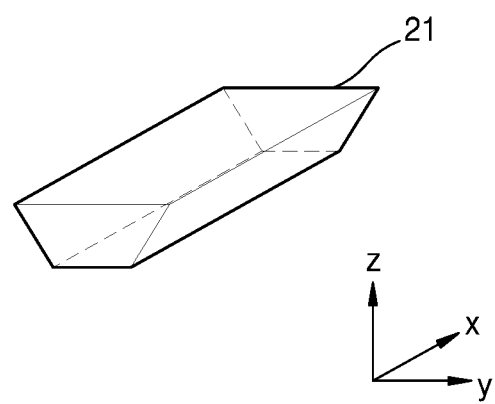
FIG. 1C is a schematic perspective view of a refraction pattern of FIG. 1B.

FIG. 1C is a schematic perspective view of a single refraction pattern 21 of FIG. 1B. Referring to FIG. 1C, a cross-section of the refraction pattern 21 in the x-axis direction may be trapezoidal. The upper surface and lower surface of the refraction pattern 21 may be in the x-y plane, perpendicular to the z-axis. When viewing the refraction pattern 21 in the x-axis direction, the width of the lower surface of the refraction pattern 21 may be smaller than that of the upper surface of the refraction pattern 21.

Figure 2A:
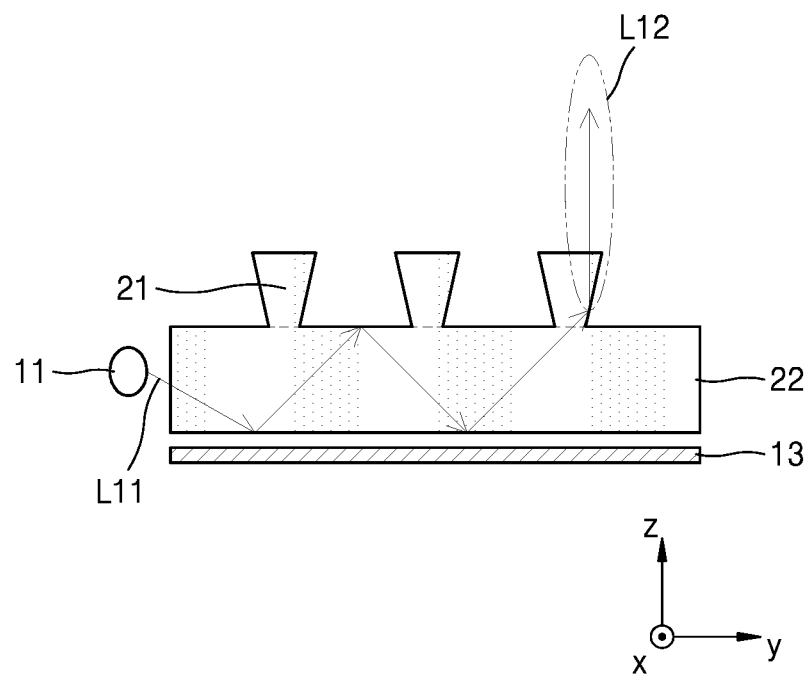
FIG. 2A is a schematic cross-sectional view illustrating an operation in which a 3D image is displayed using a 2D/3D switchable backlight unit, according to an exemplary embodiment.

FIG. 2A is a schematic cross-sectional view illustrating an operation in which a 3D image is implemented in a 2D/3D switchable backlight unit, according to an exemplary embodiment. Referring to FIG. 2A, the 2D/3D switchable backlight unit may include a first light source unit 11, a second light source unit 13, a first light guide plate 22, and a refraction pattern 21.

A point light source, such as light-emitting diode (LED), or a linear light source, such as cold cathode fluorescent lamp (CCFL), may be used as the first light source unit 11, and a planar light source may be used as the second light source unit 13.

The first light source unit 11 may be positioned at one side or both sides of the first light guide plate 22. The one side of the first light guide plate 22 may be a side in the y-axis direction, and the both sides of the first light guide plate 22 may be both sides in the +y-axis direction and the −y-axis direction. The second light source unit 13 may be positioned under the first light guide plate 22 in the −z direction.

The first light guide plate 22 and the refraction pattern 21, in which light emitted from the first light source unit 11 is totally internally reflected, may be formed of a transparent material, such as glass or plastic. The refraction pattern 21 and the first light guide plate 22 may be formed of the same material or materials with the same optical characteristics. Light may proceed, without refraction, between the refraction pattern 21 and the first light guide plate 22. The first light guide plate 22 may have the form of a flat plate.

The lower surface of the refraction pattern 21 may be substantially connected to the first light guide plate 22. Also, the refraction pattern 21 may be formed on the upper portion of the first light guide plate 22 in the +z-axis direction. Since the side of the refraction pattern 21 is slanted, the refraction pattern 21 may allow light that is totally internally reflected within the first light guide plate 22 to exit the first light guide plate 22 via the refraction pattern 21.

When displaying a 3D image, only the first light source unit 11 operates and the second light source unit 13 is turned off. Light L11 incident on the first light guide plate 22 from the first light source unit 11 may be totally internally reflected inside the first light guide plate 22 and thus proceed through the first light guide plate 22. When the light L11, proceeding through the first light guide plate 22, is incident on the refraction pattern 21, total internal reflection occurs at the side of the refraction pattern 21. The light L12 totally internally reflected within the refraction pattern 21 may be radiated to the outside of the backlight unit after passing through a second light guide plate 23 (refer to FIG. 4A). Since the light L12 is radiated to the outside of the backlight unit through total internal reflection, light radiation efficiency may be improved as compared to a method of radiating light by using a scattering pattern.

Figure 2B:
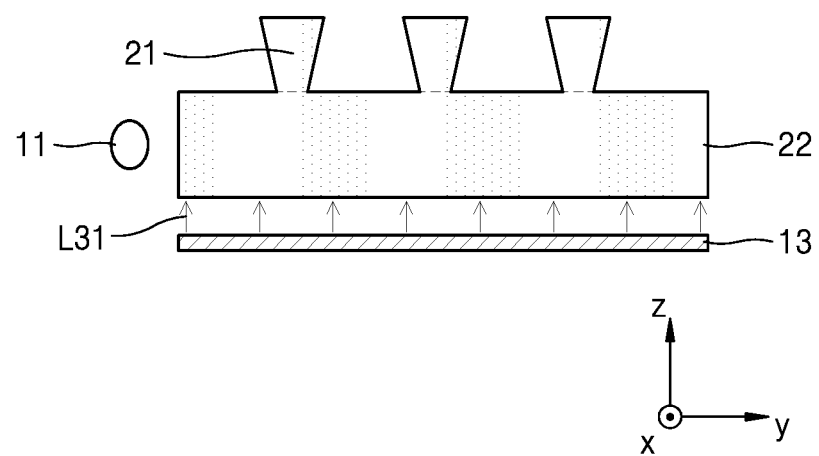
FIG. 2B is a schematic cross-sectional view illustrating an operation in which a 2D image is displayed using a 2D/3D switchable backlight unit, according to an exemplary embodiment.

FIG. 2B is a schematic cross-sectional view illustrating an operation in which a 2D image is displayed using a 2D/3D switchable backlight unit, according to an exemplary embodiment. Referring to FIG. 2B, a second light source unit 13 may operate when implementing a 2D image. The second light source unit 13 may be a substantially planar light source, and light L31, emitted from the second light source unit 13, may be radiated to the outside of the backlight unit through the first light guide plate 22 and the refraction pattern 21.

Figure 2C:
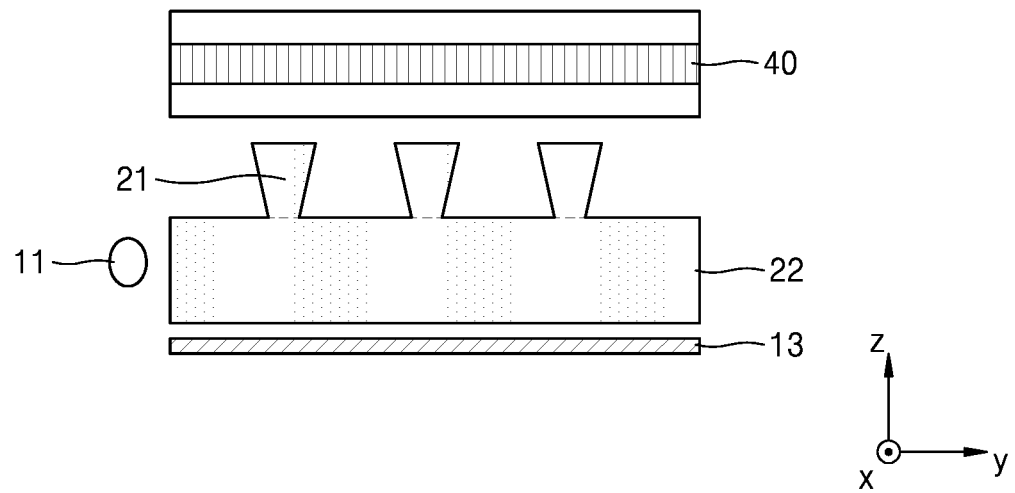
FIG. 2C is a schematic cross-sectional view of an image display apparatus including a 2D/3D switchable backlight unit, according to an exemplary embodiment.

FIG. 2C is a schematic cross-sectional view of an image display apparatus using a 2D/3D switchable backlight unit, according to an exemplary embodiment. Referring to FIG. 2C, the image display apparatus may include an image panel 40 in addition to the 2D/3D switchable backlight unit. The image panel 40 may be disposed over the refraction patterns 21 and may be spaced apart from the refraction patterns 21. Images are displayed on the image panel 40 according to image information. The image panel 40 may be a transmissive flat panel, such as a liquid crystal panel, a polymer dispersion-type liquid crystal panel, an electrowetting display panel, or an electrochromic display panel. For example, the image panel 40 may be a liquid crystal panel having a liquid crystal layer disposed between a lower plate of the image panel 40 and an upper plate of the image panel 40, and the liquid crystal layer may express grayscales of pixels as a plurality of liquid crystal cells corresponding to the pixels are independently driven. Furthermore, a color filter may be further disposed to display colors.

When displaying a 2D-image, surface light, from the second light source 13, propagates throughout the entire area of a light guide plate and light may be radiated therefrom. The image panel 40 may continuously display an image of a point in time. As a result, since a user sees the same image through both a left eye and a right eye, a time difference does not occur, and thus, 2D images may be recognized.

The refraction patterns 21 having a trapezoidal form may have an arrangement period, a height, and an angle of slant. When displaying a 3D image, the arrangement period, the height, and the angle of slant may be adjustable and thus light radiation characteristics may be adjusted. Image data that is different for each direction may be provided to the image panel according to the direction of radiated light. 3D images may be displayed by providing image data that is different for each direction.

In the 2D/3D switchable backlight unit illustrated in FIGS. 2A through 2C, only one of the plurality of pattern lines 25 shown in FIGS. 1A and 1B is illustrated. Alternately, the plurality of refraction patterns 21 may each be arranged lengthwise in the slanted direction as shown in FIGS. 1A through 1C, and the plurality of pattern lines 25 may contact one another in the horizontal direction or may be spaced apart from one another at regular intervals in the horizontal direction. The plurality of refraction patterns 21 may alternately be arranged in the vertical direction, such that the viewing angle of light that is radiated to the outside of the backlight unit by the refraction patterns 21 may be limited in the vertical direction. However, in the horizontal direction, a wide viewing angle may be obtained as compared to the viewing angle in the vertical direction since there is no total reflection by the refraction patterns 21. The vertical direction is shown as the y-axis direction, and the horizontal direction is shown as the x-axis direction in the figures.

Figure 3A:
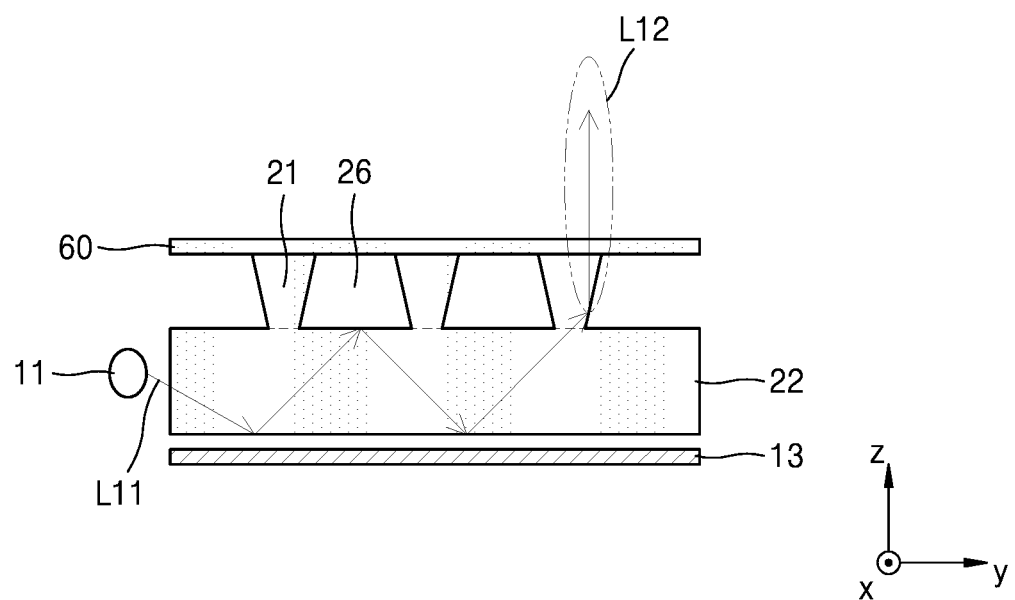
FIG. 3A is a schematic cross-sectional view illustrating an operation in which a 3D image is displayed using a 2D/3D switchable backlight unit, according to another exemplary embodiment.

FIG. 3A is a schematic cross-sectional view illustrating an operation in which a 3D image is displayed using a 2D/3D switchable backlight unit, according to another exemplary embodiment. The 2D/3D switchable backlight unit illustrated in FIG. 3A may further include a supporting film 60, as compared to the 2D/3D switchable backlight unit illustrated in FIG. 2A. Various types of structures may be attached onto the supporting film 60. The supporting film 60 may be formed of the same material as a refraction pattern 21 and a first light guide plate 22. A method by which a 3D image is displayed is the same as that described with reference to FIG. 2A.

Figure 3B:
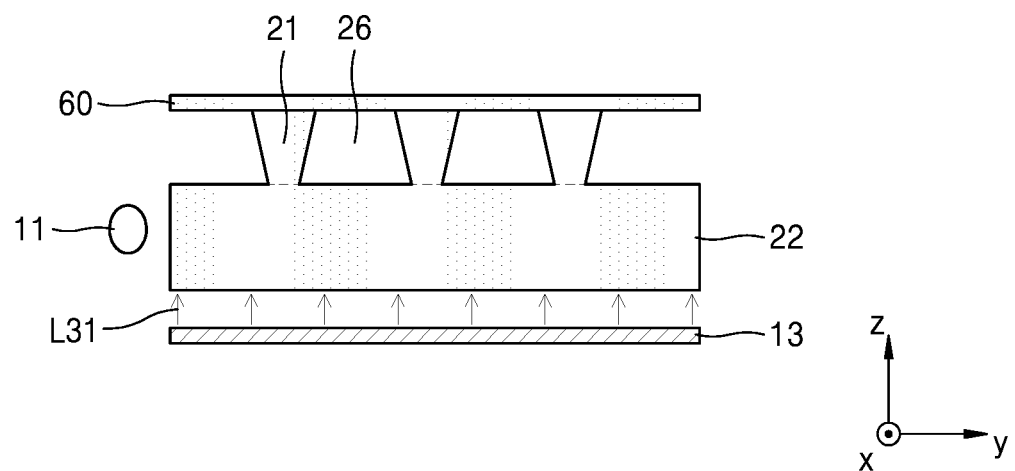
FIG. 3B is a schematic cross-sectional view illustrating an operation in which a 2D image is displayed using a 2D/3D switchable backlight unit, according to another exemplary embodiment.

FIG. 3B is a schematic cross-sectional view illustrating an operation in which a 2D image is displayed using a 2D/3D switchable backlight unit, according to another exemplary embodiment. The 2D/3D switchable backlight unit illustrated in FIG. 3B may further include a supporting film 60, as compared to the 2D/3D switchable backlight unit illustrated in FIG. 2B, and the method by which a 2D image is implemented using the backlight unit according to FIG. 3B is the same as that described with reference to FIG. 2B.

Figure 3C:
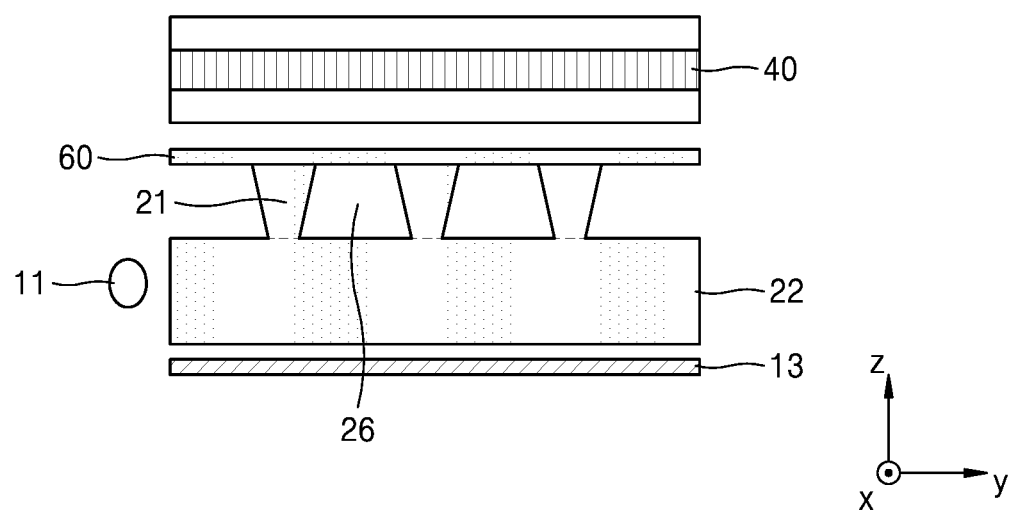
FIG. 3C is a schematic cross-sectional view of an image display apparatus including a 2D/3D switchable backlight unit, according to another exemplary embodiment.

FIG. 3C is a schematic cross-sectional view of an image display apparatus using a 2D/3D switchable backlight unit, according to another exemplary embodiment. Referring to FIG. 3C, the 2D/3D switchable backlight unit illustrated in FIG. 3C may further include a supporting film 60, as compared to the 2D/3D switchable backlight unit illustrated in FIG. 2C. In addition, an image panel 40 may be disposed on the supporting film 60, and a 2D image or a 3D image may be displayed as described with reference to FIG. 2C.

Figure 4A:
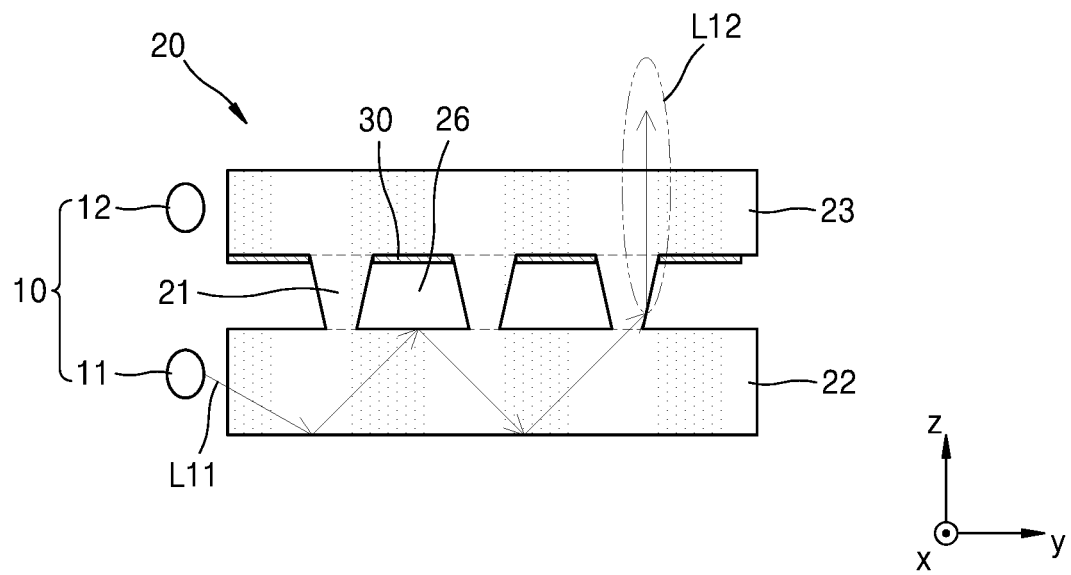
FIG. 4A is a schematic cross-sectional view illustrating an operation in which a 3D image is displayed using a 2D/3D switchable backlight unit, according to another exemplary embodiment.

FIG. 4A is a schematic cross-sectional view illustrating an operation in which a 3D image is displayed using a 2D/3D switchable backlight unit, according to another exemplary embodiment. Referring to FIG. 4A, the 2D/3D switchable backlight unit may include a light source unit 10, a light guide plate 20, and a scattering layer 30.

The light source unit 10 may include a first light source unit 11 and a third light source unit 12, and the light guide plate 20 may include a refraction pattern 21, a first light guide plate 22, and a second light guide plate 23.

A point light source, such as LED, or a linear light source, such as a CCFL, may be used as the light source unit 10.

The first light source unit 11 may be positioned at only side of the first light guide plate 22, or one first light source unit 11 may be positioned at each of both sides of the first light guide plate 22, and the third light source unit 12 may, similarly, be positioned at only one side or at each of both sides of the second light guide plate 22. The one side may be a side in the y-axis direction, and the both sides may be both sides of the light guide plates in the +y-axis direction and the −y-axis direction, as shown in FIG. 4A.

The light guide plate 20, in which light emitted from the light source unit 10 is totally internally reflected, may be formed of a transparent material, such as glass or plastic. The refraction pattern 21, the first light guide plate 22, and the second light guide plate 23 may be formed a single material or materials with the same optical properties. Accordingly, light may proceed without refraction between each the refraction pattern 21, the first light guide plate 22, and the second light guide plate 23. The light guide plate 20 may be in the form of a flat plate.

The lower surface of the refraction pattern 21 may be substantially connected to the first light guide plate 22, and the upper surface of the refraction pattern 21 may be substantially connected to the second light guide plate 23. Also, the refraction pattern 21 may be disposed between the first light guide plate 22 and the second light guide plate 23. Since the side of the refraction pattern 21 is slanted, the refraction pattern 21 may allow a ray of light, having been totally internally reflected within the first light guide plate 22, to exit the light guide plate 20.

Gaps 26 may be formed between adjacent refraction patterns 21. Since a plurality of refraction patterns 21 are disposed and spaced apart from each other at regular intervals, the gaps 26, which are each a region surrounded by the refraction pattern 21, the first light guide plate 22, and the second light guide plate 23, may be disposed in an arrangement. The gap 26, which is an external space, may have a refractive index that is different from that of the light guide plate 20. The refractive index of the light guide plate 20 may be greater than that of the gap 26. Accordingly, when light is incident on the gap 26, at a certain angle or more, from the inside of the first light guide plate 22, total internal reflection may occur.

When displaying a 3D image, only the first light source unit 11 operates and the third light source unit 12 may be turned off. A light L11 incident on the first light guide plate 22 from the first light source unit 11 may be totally internally reflected within the first light guide plate 22 and thus proceed through the first light guide plate 22. When the light L11 proceeding through the first light guide plate 22 is incident on the refraction pattern 21, total internal reflection occurs at the side of the refraction pattern 21. Light L12, which is totally internally reflected from the refraction pattern 21 may be radiated to the outside of the backlight unit after passing through a second light guide plate 23 (refer to FIG. 4A). Since the light L12 is radiated to the outside of the backlight unit via total internal reflection, light radiation efficiency may be improved as compared to a method of radiating light by using a scattering pattern.

Figure 4B:
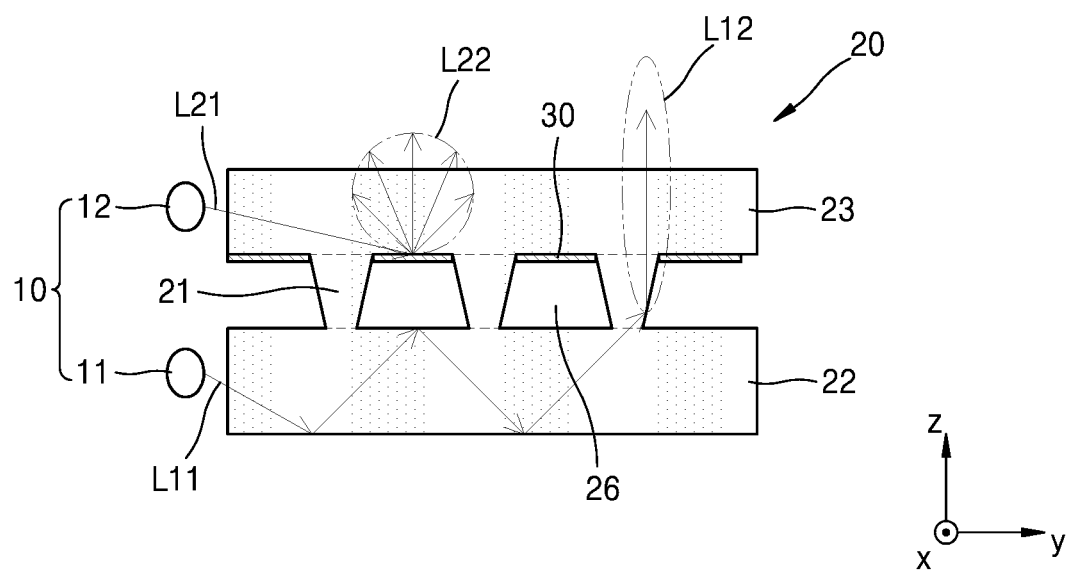
FIG. 4B is a schematic cross-sectional view illustrating an operation in which a 2D image is displayed using a 2D/3D switchable backlight unit, according to another exemplary embodiment.

FIG. 4B is a schematic cross-sectional view illustrating an operation in which a 2D image is displayed using a 2D/3D switchable backlight unit, according to another exemplary embodiment. Referring to FIG. 4B, a third light source unit 12 and a first light source unit 11 may simultaneously operate when a 2D image is being displayed. A portion of the lower surface of the second light guide plate 23 which contacts a gap 26 may include a scattering layer 30. The scattering layer 30 may scatter light by using scattering, refraction, and diffraction, and light may thereby be uniformly radiated by adjusting the size or density of the scattering layer 30. Accordingly, the scattering layer 30 may convert incident light into surface light.

Light L21 incident on a second light guide plate 23 from the third light source unit 12 may be scattered by the scattering layer 30. Light L22 scattered by the scattering layer 30 may be radiated, as surface light, to the outside of a second light guide plate 23. However, a portion of the lower surface of the second light guide plate 23, connected to a refraction pattern 21, may prevent light from being radiated to the outside of the backlight unit, and thus, the uniformity of the surface light may be lowered in this portion. To make up for this weak point, the first light source unit 11 and the third second light source unit 12 may operate simultaneously. Light L11 incident on a first light guide plate 22 from the first light source unit 11 may be totally internally reflected and may propagate within the first light guide plate 22, and thus, this light is incident on the refraction pattern 21. The light L11 incident on the refraction pattern 21 may be totally internally reflected at the refraction pattern 21. Light L12, which is totally internally reflected by the refraction pattern 21 may be radiated to the outside of the backlight unit through the second light guide plate 23. Accordingly, when the first light source unit 11 and the third second light source unit 12 operate simultaneously, the uniformity of the surface light may increase as compared to a situation in which only the third light source unit 12 is operated. In this case, the intensity of the first light source unit 11 may be adjusted to ensure a more uniform distribution of the surface light.

Figure 4C:
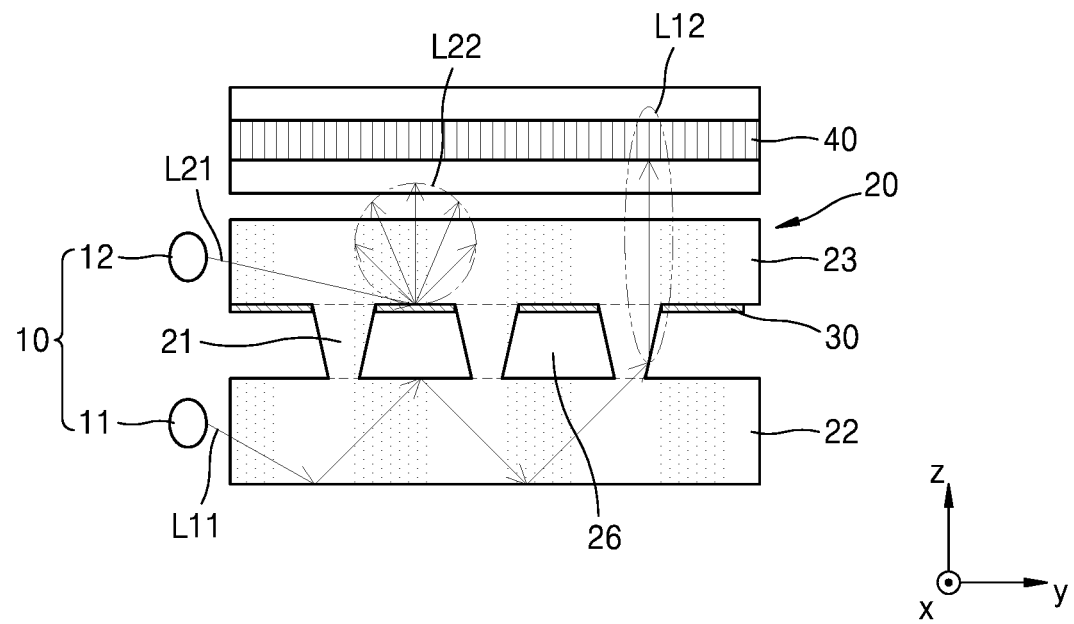
FIG. 4C is a schematic cross-sectional view of an image display apparatus including a 2D/3D switchable backlight unit, according to another exemplary embodiment.

FIG. 4C is a schematic cross-sectional view of an image display apparatus using a 2D/3D switchable backlight unit, according to another exemplary embodiment. Referring to FIG. 4C, the image display apparatus may include an image panel 40 in addition to the 2D/3D switchable backlight unit. The image panel 40 may be disposed over the refraction patterns 21 and may be separated from the refraction patterns 21. The image panel 40 is a device on which images are displayed according to image information. The image panel 40 may be a transmissive flat panel, such as a liquid crystal panel, a polymer dispersion-type liquid crystal panel, an electrowetting display panel, or an electrochromic display panel. For example, the image panel 40 may be a liquid crystal panel having a liquid crystal layer disposed between a lower plate of the image panel 40 and an upper plate of the image panel 40, and the liquid crystal layer may express grayscales of pixels as a plurality of liquid crystal cells corresponding to the pixels are independently driven. Furthermore, a color filter may be additionally disposed to display colors.

When a 2D-image is displayed, light is propagated throughout the entire area of the light guide plate 20 and light may be radiated on all visual fields. The image panel 40 may continuously display an image of a point in time. As a result, since a user sees the same image through both a left eye and a right eye, a time difference does not occur, and thus, 2D images may be recognized.

The refraction patterns 21 having a trapezoidal form may have an arrangement period, a height, and an angle of slant. When a 3D image is displayed, the arrangement period, the height, and the angle of slant may be adjustable and thus light radiation characteristics may also be adjustable. Image data that is different for each direction may be provided by using different data of an image panel according to the direction of radiated light. 3D images may be expressed by providing image data that is different for each direction.

In the 2D/3D switchable backlight unit illustrated in FIGS. 4A through 4C, only one of the plurality of pattern lines 25, shown in FIGS. 1A and 1B, is illustrated. In addition, the plurality of refraction patterns 21 may be arranged lengthwise in a slanted vertical direction as shown in FIGS. 1A through 1C, and the plurality of pattern lines 25 including the plurality of refraction patterns 21 may be arranged in an arrangement in which the plurality of pattern lines 25 are connected to one another in the horizontal direction or in an arrangement in which the pattern lines 25 are spaced apart from one another at regular intervals. Since the plurality of refraction patterns 21 are arranged in the vertical direction, the viewing angle of a ray of light that is radiated to the outside of the backlight unit by the refraction patterns 21 may be limited in the vertical direction. However, in the horizontal direction, a wide viewing angle may be obtained as compared to the viewing angle in the vertical direction since there is no total internal reflection by the refraction patterns 21. The vertical direction denotes the y-axis direction, and the horizontal direction denotes the x-axis direction.

Figure 5A:
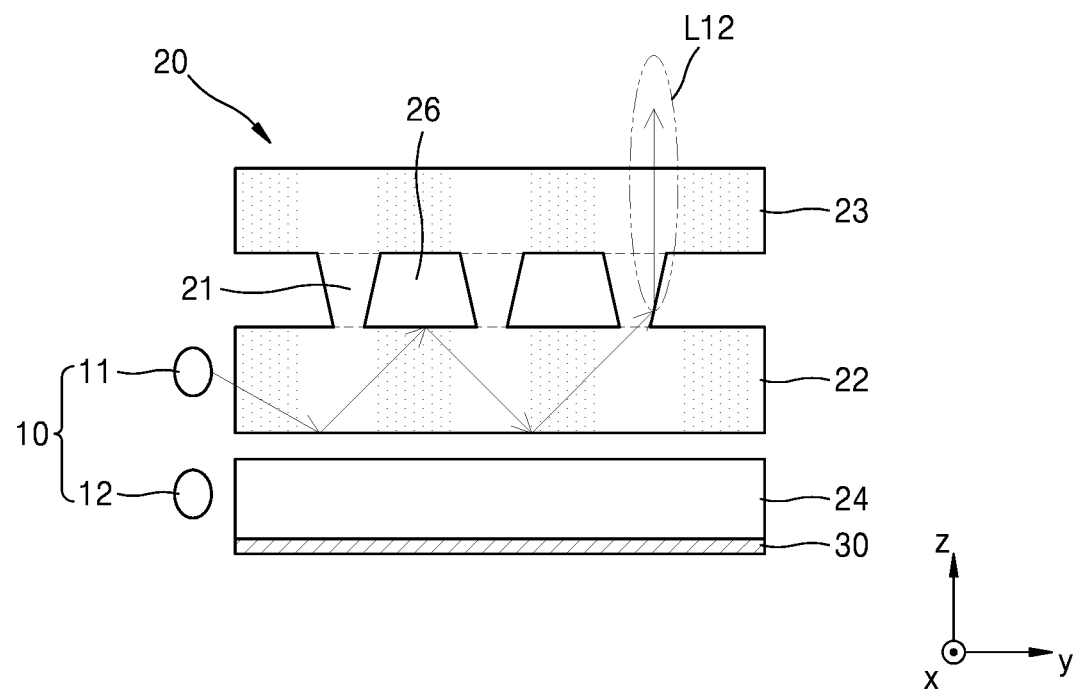
FIG. 5A is a schematic cross-sectional view illustrating an operation in which a 3D image is displayed using a 2D/3D switchable backlight unit, according to another exemplary embodiment.

FIG. 5A is a schematic cross-sectional view illustrating an operation in which a 3D image is displayed using a 2D/3D switchable backlight unit, according to another exemplary embodiment. As compared to the 2D/3D switchable backlight unit illustrated in FIG. 4A, 2D/3D switchable backlight unit illustrated in FIG. 5A may further include a third light guide plate 24, and a scattering layer 30 may be disposed on the lower surface of the third light guide plate 24. The third light guide plate 24 is disposed under a first light guide plate 22 and is separated from the first light guide plate 22. The third light guide plate 24 may be formed in the same material as a refraction pattern 21, a first light guide plate 22, and a second light guide plate 23.

In the 2D/3D switchable backlight unit of FIG. 5A, the second light guide plate 23 may be omitted, and a supporting film 60 may be used instead of the second light guide plate 23.

A first light source unit 11 may be positioned at one side or at each of both sides of the first light guide plate 22, and a third light source unit 12 may be positioned at one side or at east of both sides of the third light guide plate 24. The one side may be a side in the y-axis direction, and the both sides of the first light guide plate 22 may be both sides in the +y-axis direction and the −y-axis direction.

The third light source unit 12 may be positioned under the third light guide plate 24 in the −z direction.

When displaying a 3D image, only the first light source unit 11 operates and the third light source unit 13 may be turned off. Light L11 incident on the first light guide plate 22 from the first light source unit 11 may be totally internally reflected within the first light guide plate 22 and thus proceed through the first light guide plate 22. When the light L11 proceeding through the first light guide plate 22 is incident on the refraction pattern 21, total internal reflection occurs at the side of the refraction pattern 21. Light L12 which is totally internally reflected from the refraction pattern 21 may be radiated to the outside of the backlight unit after passing through the second light guide plate 23. Since the light L12 is radiated to the outside of the backlight unit via through total internal reflection, light radiation efficiency may be improved as compared to a method of radiating light by using a scattering pattern.

Figure 5B:
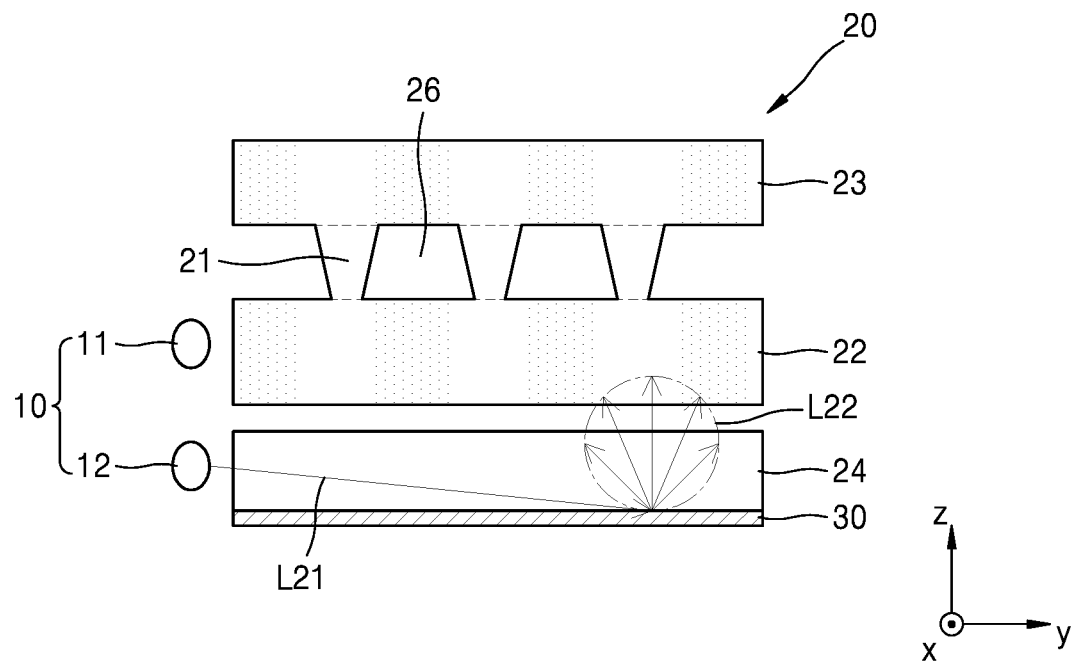
FIG. 5B is a schematic cross-sectional view illustrating an operation in which a 2D image is displayed using a 2D/3D switchable backlight unit, according to another exemplary embodiment.

FIG. 5B is a schematic cross-sectional view illustrating an operation in which a 2D image is displayed using a 2D/3D switchable backlight unit, according to another exemplary embodiment. Referring to FIG. 5B, when displaying a 2D image, only a third light source unit 12 operates and a first light source unit 11 may be turned off. A scattering layer 30 may be disposed on the bottom of the third guide plate 24. The scattering layer 30 may scatter light by using scattering, refraction, and diffraction, and light may be uniformly radiated by adjusting the size or density of the scattering layer 30. Accordingly, the scattering layer 30 may convert incident light into surface light. Light incident on a third light guide plate 24 from the third light source unit 12 may be scattered by the scattering layer 30 and radiated in the form of surface light. When surface light, scattered by the scattering layer 30, is radiated to the outside of the backlight unit, a third light guide plate 22, a refraction pattern 21, and a second light guide plate 23, positioned on the third light guide plate 24, may not influence the radiated surface light because the thirst light guide plate 22, the refraction pattern 21, and the second light guide plate 23 are formed of the same material as the third light guide plate 24.

In addition, when displaying a 2D image, a surface light source that is formed of a light source array and positioned under the light guide plate 24 may be used instead of using the third light source unit 12 positioned at one side of the third light guide plate 24. In other words, the third light source unit 12 may be positioned under the third light guide plate 24 in the-z-axis direction.

Figure 5C:
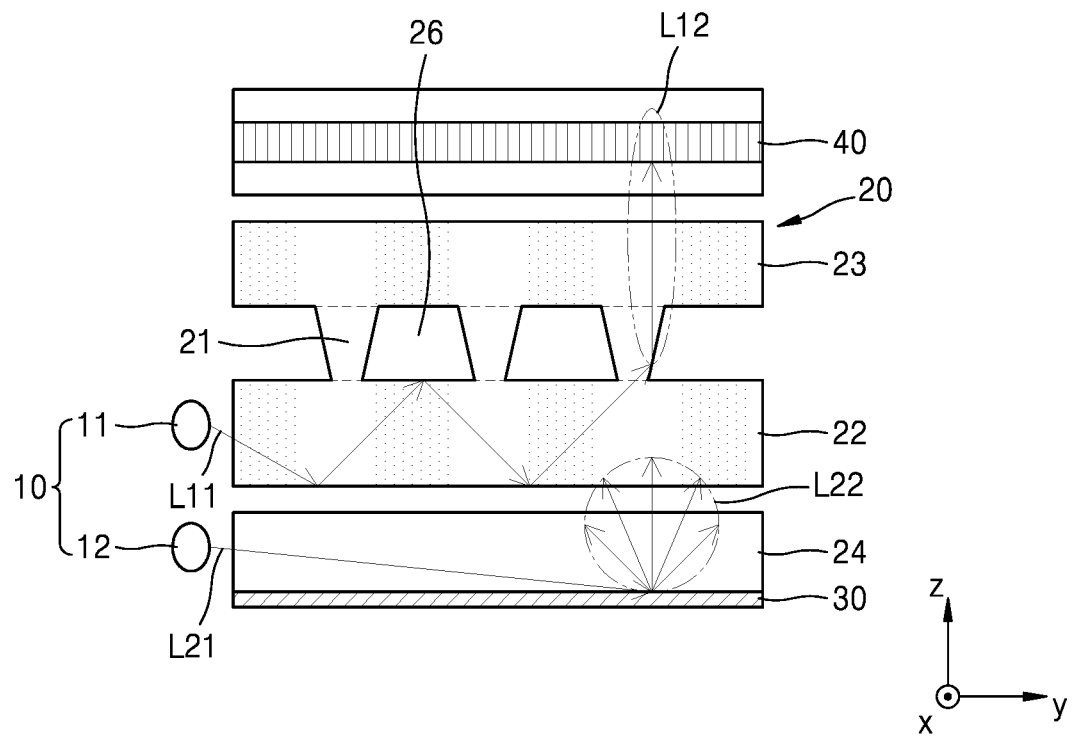
FIG. 5C is a schematic cross-sectional view of an image display apparatus including a 2D/3D switchable backlight unit, according to another exemplary embodiment.

FIG. 5C is a schematic cross-sectional view of an image display apparatus using a 2D/3D switchable backlight unit, according to another exemplary embodiment. Referring to FIG. 5C, the image display apparatus may further include an image panel 40 which is separated from a light guide plate 20. The image panel 40 may be disposed on the refraction patterns 21 and be separated from the refraction patterns 21. The image panel 40 is a device on which images are displayed according to image information. The image panel 40 may be a transmissive flat panel, such as a liquid crystal panel, a polymer dispersion-type liquid crystal panel, an electrowetting display panel, or an electrochromic display panel. For example, the image panel 40 may be a liquid crystal panel having a liquid crystal layer between a lower plate of the image panel 40 and an upper plate of the image panel 40, and the liquid crystal layer may express grayscales of pixels when a plurality of liquid crystal cells corresponding to the pixels are independently driven. Furthermore, a color filter may be further disposed to display colors.

When displaying a 2D-image, surface light is propagated throughout the entire area of a light guide plate 20 and the light may be radiated on all visual fields. The image panel 40 may continuously display an image of a point in time. As a result, since a user sees the same image through both a left eye and a right eye, a time difference does not occur, and thus, 2D images may be recognized.

The refraction patterns 21 having a trapezoidal form may have an arrangement period, a height, and an angle of slant. When displaying a 3D image, the arrangement period, the height, and the angle of slant may be adjustable and thus light radiation characteristics may also be adjustable. Image data that is different for each direction may be provided by using different data of an image panel according to the direction of radiated light. 3D images may be expressed by providing image data that is different for each direction.

Figure 6A:
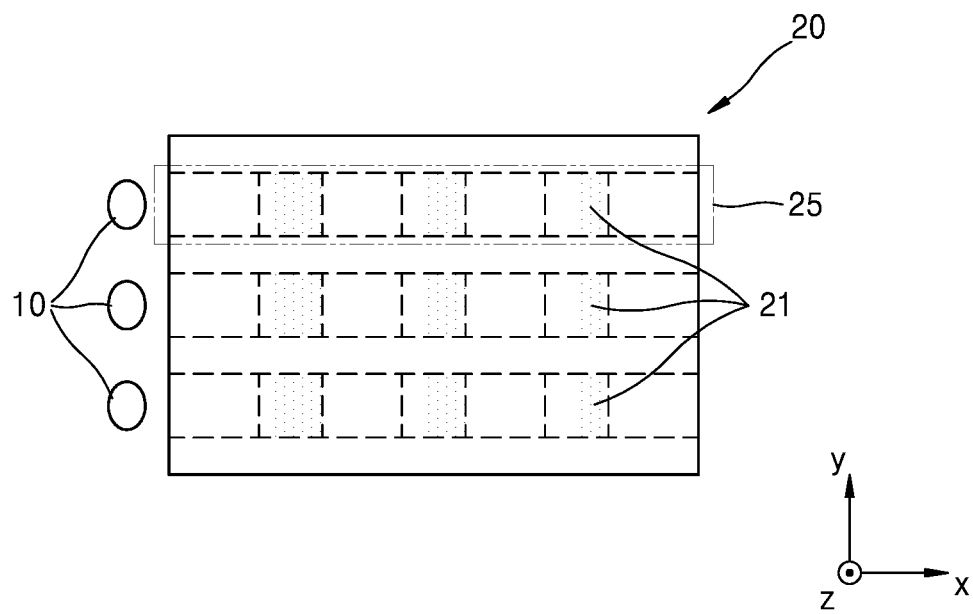
FIG. 6A is a plan view of a 2D/3D switchable backlight unit according to another exemplary embodiment.
Figure 6B:
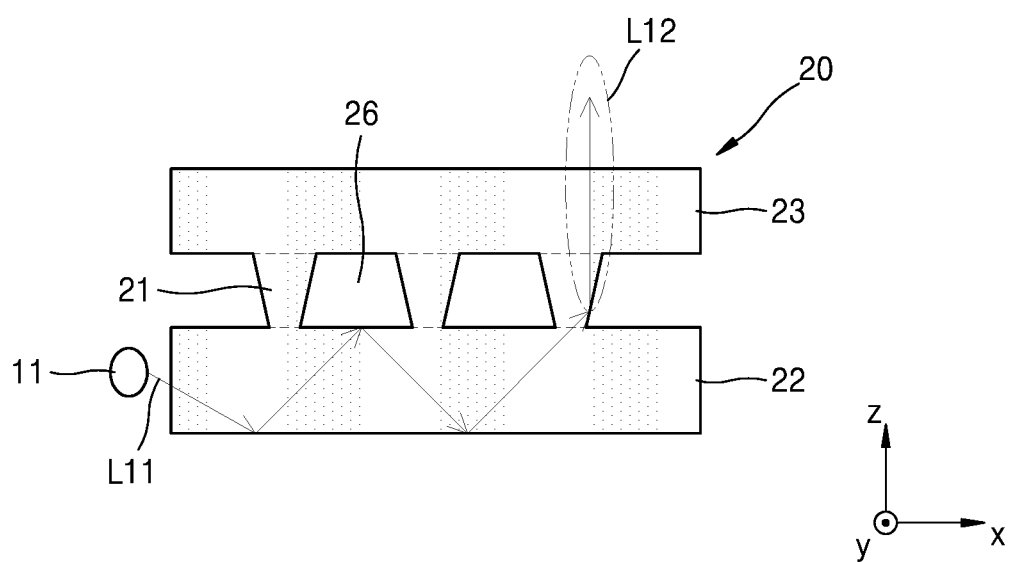
FIG. 6B is a schematic cross-sectional view of the 2D/3D switchable backlight unit of FIG. 6A.

FIG. 6A is a plan view of a 2D/3D switchable backlight unit according to another exemplary embodiment, and FIG. 6B is a schematic cross-sectional view of the 2D/3D switchable backlight unit of FIG. 6A.

Referring to FIGS. 6A and 6B, a plurality of light sources 10 may be disposed at one side or at each of both sides of a light guide plate 20. The one side of the light guide plate 20 may be a side in the y-axis direction, and the both sides of the light guide plate 20 may be both sides in the +y-axis direction and the −y-axis direction. A plurality of pattern lines 25, each including a plurality of refraction patterns 21, each having a trapezoidal form, may be arranged lengthwise in the horizontal (x-axis) direction. The plurality of pattern lines 25 may be arranged so that they are connected to one another in the vertical direction or, alternately, so that they are spaced apart from one another at regular intervals in the vertical (y-axis) direction. Since the plurality of refraction patterns 21 are arranged in the horizontal direction, the viewing angle of light that is radiated to the outside of the backlight unit by the refraction patterns 21 may be limited in the horizontal direction. However, in the vertical direction, a wide viewing angle may be obtained, as compared to the viewing angle in the horizontal direction, since there is no total internal reflection by the refraction patterns 21. The vertical direction denotes the y-axis direction, and the horizontal direction denotes the x-axis direction.

Figure 6C:
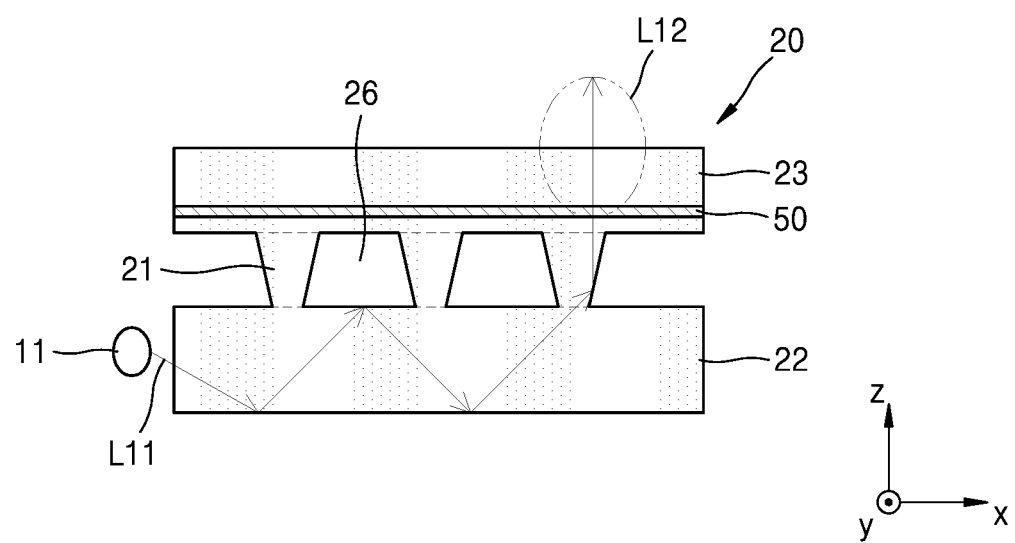
FIG. 6C is a schematic cross-sectional view of a 2D/3D switchable backlight unit according to another exemplary embodiment.

FIG. 6C is a schematic cross-sectional view of a 2D/3D switchable backlight unit according to another exemplary embodiment. As described above, in the 2D/3D switchable backlight unit of FIG. 6B, a viewing angle may be wide in the vertical direction but be narrow in the horizontal direction. In the 2D/3D switchable backlight unit of FIG. 6C, a directional scattering structure or film 50 may be included within a second light guide plate 23. The directional scattering structure or film 50 may include scattering particles or a lens array, and thus may scatter incident light in the horizontal direction. Accordingly, a viewing angle in the horizontal direction may be increased.

FIGS. 7A through 7F are cross-sectional views sequentially illustrating a method of manufacturing a 2D/3D switchable backlight unit, according to an exemplary embodiment.

Figure 7A:
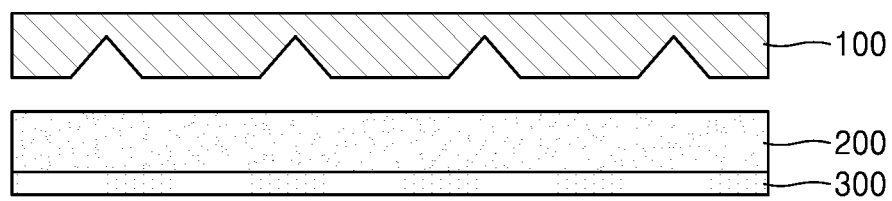
FIGS. 7A through 7F are cross-sectional views illustrating a method of manufacturing a 2D/3D switchable backlight unit, according to an exemplary embodiment.

Referring to FIG. 7A, a first synthetic resin 200 is coated on a first light guide plate 300. The first light guide plate 300 may have the form of a flat plate, and the first synthetic resin 200 may be heat-cured or ultraviolet (UV)-cured. A mold 100 may have a concave pyramid form.

Figure 7B:
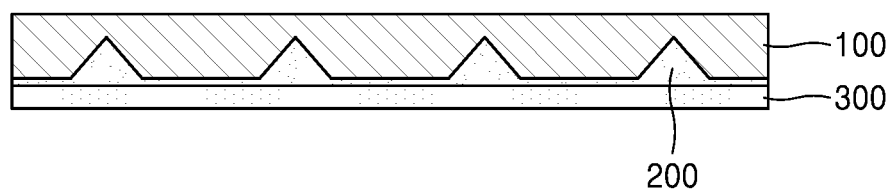
Figure 7C:
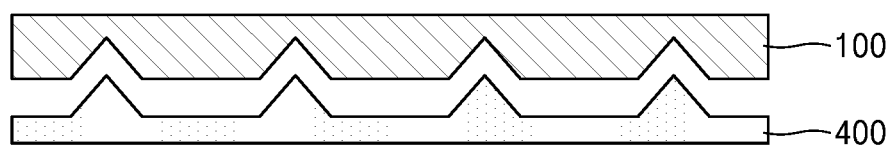

Referring to FIGS. 7B and 7C, the mold 100 is brought into contact with the first synthetic resin 200 coated on the first light guide plate 300 and pressure is applied to the first synthetic resin 200. After pressure is applied to the first synthetic resin 200, the first synthetic resin 200 is cured through UV curing or heat curing. The first synthetic resin 200 may be the same material as the first light guide plate 300, and thus, when the first synthetic resin 200 is cured, the first synthetic resin 200 and the first light guide plate 300 may be combined with each other, forming a light guide plate 400 having a convex pyramid form.

Figure 7D:
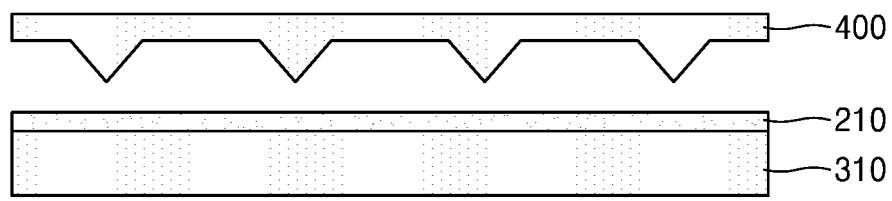
Figure 7E:
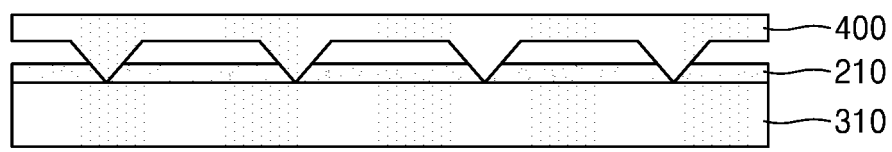

Referring to FIGS. 7D and 7E, a second synthetic resin 210 is coated on a second light guide plate 310. The second light guide plate 310 may have the form of a flat plate, and the second synthetic resin 210 may be heat-cured or ultraviolet (UV)-cured. Next, in a state in which the convex pyramid form of the light guide plate 400 is directed downward, the light guide plate 400 is brought into contact with the second synthetic resin 210 and pressure is applied to the second synthetic resin 210. After pressure is applied to the second synthetic resin 210, the second synthetic resin 210 is cured through UV curing or heat curing. The second synthetic resin 210, the second light guide plate 310, and the light guide 400 may be formed of the same material.

Figure 7F:
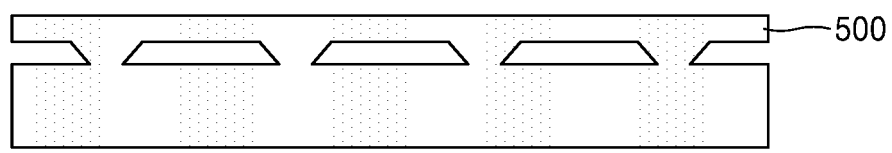

Referring to FIG. 7F, when the curing of the second synthetic resin 210 is completed, the combination of the light guide plate 400, the synthetic resin 210 and the second light guide plate 310 form a single light guide plate 500, including a refraction pattern.

According to the one or more of the above exemplary embodiments, a 2D/3D switchable backlight unit and an image display apparatus using the 2D/3D switchable backlight unit may selectively radiate light by using total internal reflection that is caused by a refraction pattern (trapezoidal pattern) formed in a light guide plate. Since the 2D/3D switchable backlight unit and the image display apparatus radiate light by using total internal reflection instead of scattering, light use efficiency may be improved. In this way, the degradation of brightness in a 3D mode may be prevented.

In addition, the form of a linear light source, a radiation angle, and directivity may be adjusted by adjusting an angle of the refraction pattern (trapezoidal pattern) and an arrangement position thereof.

In addition, the 2D/3D switchable backlight unit and the image display apparatus may selectively display a 2D image and a 3D image by using only a single backlight unit structure without the need of an additional apparatus.

It should be understood that exemplary embodiments described herein should be considered in a descriptive sense only and not for purposes of limitation. Descriptions of features or aspects within each exemplary embodiments should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A two-dimensional (2D)/three-dimensional (3D) switchable backlight unit comprising:
   a light source unit comprising a first light source and a second light source;
   a first light guide plate;
   a second light guide plate disposed on an upper surface of the first light guide plate; and
   a plurality of refraction patterns, each having a trapezoidal form, disposed between the first light guide plate and the second light guide plate;
   wherein the first light source comprises one of a point light source and a linear light source and is positioned to illuminate a side of the first light guide plate,
   wherein the second light source comprises a planar light source positioned below and throughout a whole of a lower surface of the first light guide plate, opposite to the upper surface, and configured to illuminate totally in planer the lower surface of the first light guide plate,
   wherein, in a 3D mode, the first light source operates and the second light source is turned off, and in a 2D mode, the first light source is turned off and the second light source operates, and
   wherein a directional scattering film is embedded in the second light guide plate, the directional scattering film including a lens array.

2. The 2D/3D switchable backlight unit of claim 1, wherein the plurality of refraction patterns are aligned in a first direction.

3. The 2D/3D switchable backlight unit of claim 1, wherein the plurality of refraction patterns are aligned in a horizontal direction.

4. The 2D/3D switchable backlight unit of claim 1, wherein the plurality of refraction patterns are arranged in a plurality of pattern lines.

5. A 2D/3D switchable display device comprising:
   the backlight unit of claim 1, and
   an image panel.

6. The 2D/3D switchable backlight unit of claim 1, wherein the plurality of refraction patterns have an arrangement period, a height, and an angle of slant.

7. A two-dimensional (2D)/three-dimensional (3D) switchable backlight unit comprising:
   a light source unit comprising a first light source and a second light source; and
   a light guide plate unit comprising: a first light guide plate, a second light guide plate disposed above the first light; guide plate, a third light guide plate disposed under the first light guide plate and a plurality of refraction patterns disposed between the first light guide plate and the second light guide plate, each of the plurality of refraction patterns having a trapezoidal form; and
   a scattering layer disposed on a lower surface of the third light guide plate,
   wherein the first light source comprises one of a point light source and a linear light source and is positioned to illuminate a side of the first light guide plate;
   wherein the second light source comprises one of a point light source and a linear light source and is positioned to illuminate a side of the third light guide plate; and
   wherein, in a 3D mode, the first light source operates and the second light source is turned off, and in a 2D mode, the first light source is turned off and the second light source operates and the scattering layer scatters light to convert an incident light into surface light, and
   wherein the second light guide plate comprises at least one of a directional scattering structure and a directional film, and
   wherein in an entire upper surface of the third light guide plate facing the first light guide plate is planar.

8. The 2D/3D switchable backlight unit of any claim 7, wherein the third light guide plate is separate from the first light guide plate.

9. The 2D/3D switchable backlight unit of claim 7, wherein the plurality of refraction patterns are aligned in a first direction.

10. The 2D/3D switchable backlight unit of claim 7, wherein the plurality of refraction patterns are aligned in a horizontal direction.

11. The 2D/3D switchable backlight unit of claim 7, wherein the plurality of refraction patterns are arranged in a plurality of pattern lines.

12. A 2D/3D switchable display device comprising:
    the backlight unit of claim 7, and
    an image panel.

13. The 2D/3D switchable backlight unit of claim 7, wherein the plurality of refraction patterns have an arrangement period, a height, and an angle of slant.

14. The 2D/3D switchable backlight unit of claim 11, wherein the plurality of pattern lines are slanted with respect a horizontal direction and a vertical direction.

* * * * *